United States Patent
Bradshaw, Jr. et al.

(10) Patent No.: US 6,279,028 B1
(45) Date of Patent: *Aug. 21, 2001

(54) OPERATING SYSTEM HAVING A MECHANISM FOR HANDLING A GROUP OF RELATED PROCESSES RESIDING ON SEPARATE MACHINES

(75) Inventors: Robert David Bradshaw, Jr., Milpitas; Ajit Dandapani, Los Altos, both of CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/569,463

(22) Filed: Dec. 8, 1995

(51) Int. Cl.$^7$ .................................................. G06F 9/00
(52) U.S. Cl. ............................................. 709/201; 709/102
(58) Field of Search .................................... 395/704, 680, 395/200.31; 709/100, 102, 104, 105, 200, 201, 202, 205

(56) References Cited

U.S. PATENT DOCUMENTS

| | | | |
|---|---|---|---|
| 4,413,318 | * 11/1983 | Herrington | 364/200 |
| 5,047,925 | * 9/1991 | Kun et al. | 364/200 |
| 5,301,322 | * 4/1994 | Hamanaka et al. | 395/650 |
| 5,544,316 | * 8/1996 | Carpenter et al. | 275/200.03 |

OTHER PUBLICATIONS

Kaashoek et al, Grup communication in the Ameoba operating system, IEEE 1991.*
Kaashoek et al, Transparent Fault Tolerance In Parallel ORCA Programs, Symposium On Experiences With Distributed And Multiprocessor Ststem, pp. 297–312 Mar. 1992.*
Natarajan et al, Measurement Based Characterization of Global Memory And Network Contention, Operating System And Parallelization, DEC/OS/1 Reference Pages, Section 3, –Routines, vol. 2 2/94 pp 1–459.*
Khalidi et al, An Implementation of Unix On An On An Object–Oriented Operating System, Sun Microsystems Laboratories pp 1–11.*

* cited by examiner

*Primary Examiner*—Majid Banankhah
(74) *Attorney, Agent, or Firm*—Wagner, Murabito & Hao LLP

(57) ABSTRACT

A method of correlating a group of related processes residing on separate computers of a computer network so that they can be treated as a single entity. A single, large program is split up into separate processes and simultaneously run on several different computers. These related, but separate, processes are assigned a unique identifier. When a new process is created, it is assigned the same identifier as that of the process from which it was created, even though the child process might reside on a different computer. If a process determines that it should not belong to its current group, that process can create its own group by requesting that it be assigned a new identifier. Based on the identifiers, it is possible to implement programs that treat related processes as a single entity.

15 Claims, 9 Drawing Sheets

OPERATING SYSTEM HAVING A MECHANISM FOR HANDLING A GROUP OF RELATED PROCESSES RESIDING ON SEPARATE MACHINES

FIELD OF THE INVENTION

The present invention relates to the field of computer networks. Specifically, the present invention relates to the field of managing sets of processes in a network environment.

BACKGROUND OF THE INVENTION

Computers started off as big, centralized mainframe systems. Subsequently, minicomputers, workstations, and personal computers offered significant cost advantages and increased flexibility. Often, multiple computers are coupled together to form a local area network. Thereby, files, resources, information, and communications can be shared by the users. Programs or "jobs" are typically still processed by a user's primary computer. Indeed, current methods of managing multiple related processes are generally limited to a single machine. However, certain jobs may be overly complex or too time-consuming for a single computer to handle. Hence, it would be beneficial if such jobs could somehow be distributed so that they span two or more different computers on the network. In this manner, multiple machines could simultaneously The processing different parts of the job. For this to be implemented, there is a need for an apparatus and method of managing sets of related processes across a network.

Ancillary to the problem of having computers processing different jobs and different pieces of jobs relates to that of resource accounting. Computer networks often have many different, unrelated users that need to be charged separately for resource usage. A system for resource accounting provides records of resource usage that distinguishes users and tracks relevant resource usage information in a manner convenient for later analysis and compilation.

Standard accounting procedures call for the operating system kernel to write a record of resource usage information to a specific file whenever a process exits. The basic unit for record keeping is an individual process. The data generated by this accounting procedure can later be analyzed and post-processed to generate records for individual users or groups of users. However, the standard accounting procedure just described suffers several severe limitations. Many of these problems stem from the granularity of the accounting unit, an individual process, which proves very small for recording purposes. One problem is this system utilizes excessive time for recording information. Each process exit requires a record update. These updates require the system to halt other processing temporarily; the sum total of these delays can significantly stall a system. A second problem is that the amount of data generated by this system is substantial. The space to record the data and the time to analyze and post-process the data is proportional to the number of processes, which is generally very large.

A third problem arises specifically in the context of computer networks. On a network, a single, large process can be divided into several, small processes to run on several different machines simultaneously. For the purposes of both job control and accounting, it would be useful to treat these separate processes as a single entity. For example, a user might wish to remove a collection of related jobs from the entire set of machines simultaneously. In a similar manner, it would be desirable to allow a group of related processes, across different machines, to have their resource usage recorded as a group.

Therefore, it is an object of the present invention to improve the management structure for processes in a networked environment. It is also the object of the present invention to provide an accounting system for resource usage based on the grouping of related processes that offers significant advantages in terms of time, memory, and convenience of use. These and other objects of the present invention not specifically mentioned above will be evident from the detailed descriptions of the present invention herein presented.

SUMMARY OF THE INVENTION

The present invention pertains to a method of correlating a group of related processes residing on separate computers of a computer network so that they can be treated as a single entity. A single, large program is split up into separate processes and simultaneously run on several different computers. This group of related processes are referred to as an array session. Each array session is identified by a unique number, the array session handle. Every process in the computer network contains a reference to one array session handle. All of the processes in the computer network that have the same array session handle are considered to be members of the same array session.

When a new process (i.e., the child process) is created, it is assigned the same array session handle as its parent (i.e., the process that created it). The child process inherits the same array session handle as its parent process, even though the child process is on a separate computer from the parent process that had conceptually created it. If a process determines that it should not belong to its parent's array session, the process can create a new array session (e.g., batch queuing systems that spawn a multi-process job). The operating system provides a mechanism for finding and identifying all of the processes that belong to a particular array session on the computer network. With this information, it is possible to implement programs that treat the array session as a single entity.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for correlating related processes on separate computer systems is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. It should be noted that the present invention may be used on a single machine or a network of machines. Furthermore, the present invention is designed to function automatically on a network without the need for substantial additional hardware.

Figure 1:
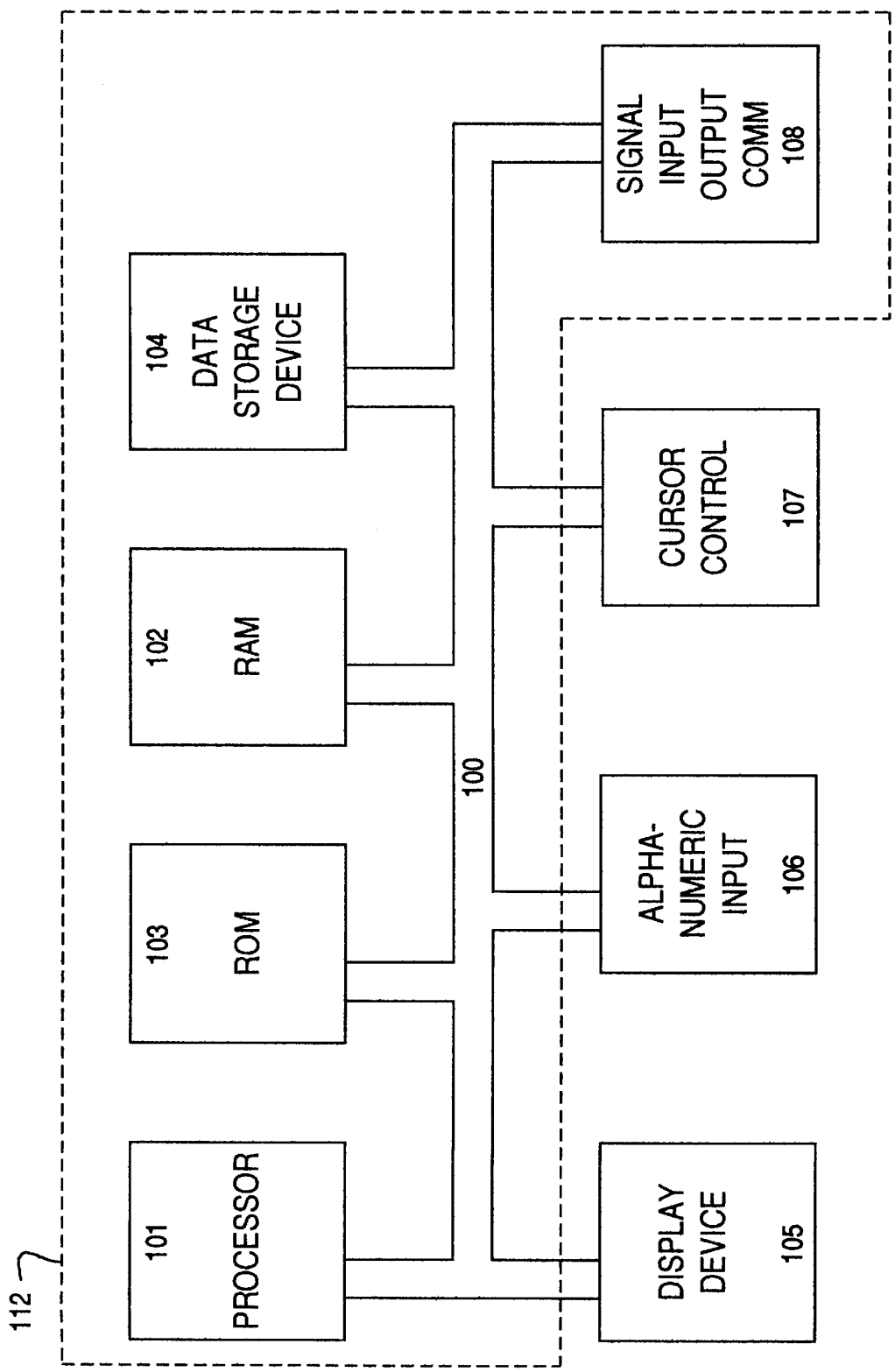
FIG. 1 illustrates an exemplary computer system used as a part of a computer network in accordance with the present invention.

FIG. 1 illustrates an exemplary computer system 112 used as a part of a computer controlled graphic display system in accordance with the present invention. It is appreciated that the computer system 112 of FIG. 1 is exemplary only and that the present invention can operate within a number of different computer systems including general purpose computers systems, embedded computer systems, and computer systems specially adapted for graphics display.

Computer system 112 of FIG. 1 includes an address/data bus 100 for communicating information, a central processor 101 unit coupled with the bus 100 for processing information and instructions, a random access memory 102 coupled with the bus 100 for storing information and instructions for the central processor 101, a read only memory 103 coupled with the bus 100 for storing static information and instructions for the processor 101, a data storage device 104 (e.g. a magnetic or optical disk and disk drive) coupled with the bus 100 for storing information and instructions, a display device 105 coupled to the bus 100 (or alternatively coupled to hardware unit 250) for displaying information (e.g., graphics primitives) to a computer user, an alphanumeric input device 106 including alphanumeric and function keys coupled to the bus 100 for communicating information and command selections to the central processor 101, a cursor control device 107 coupled to the bus for communicating user input information and command selections to the central processor 101, and a signal generating device 108 coupled to the bus 100 for communicating command selections to the processor 101. Memory device (e.g., RAM) 102 contains an instruction or code cache 102a and a data cache 102b.

The display device 105 of FIG. 1 utilized with the computer system 112 of the present invention may be a liquid crystal device, cathode ray tube, or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, touch pad, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices as described above.

Figure 2:
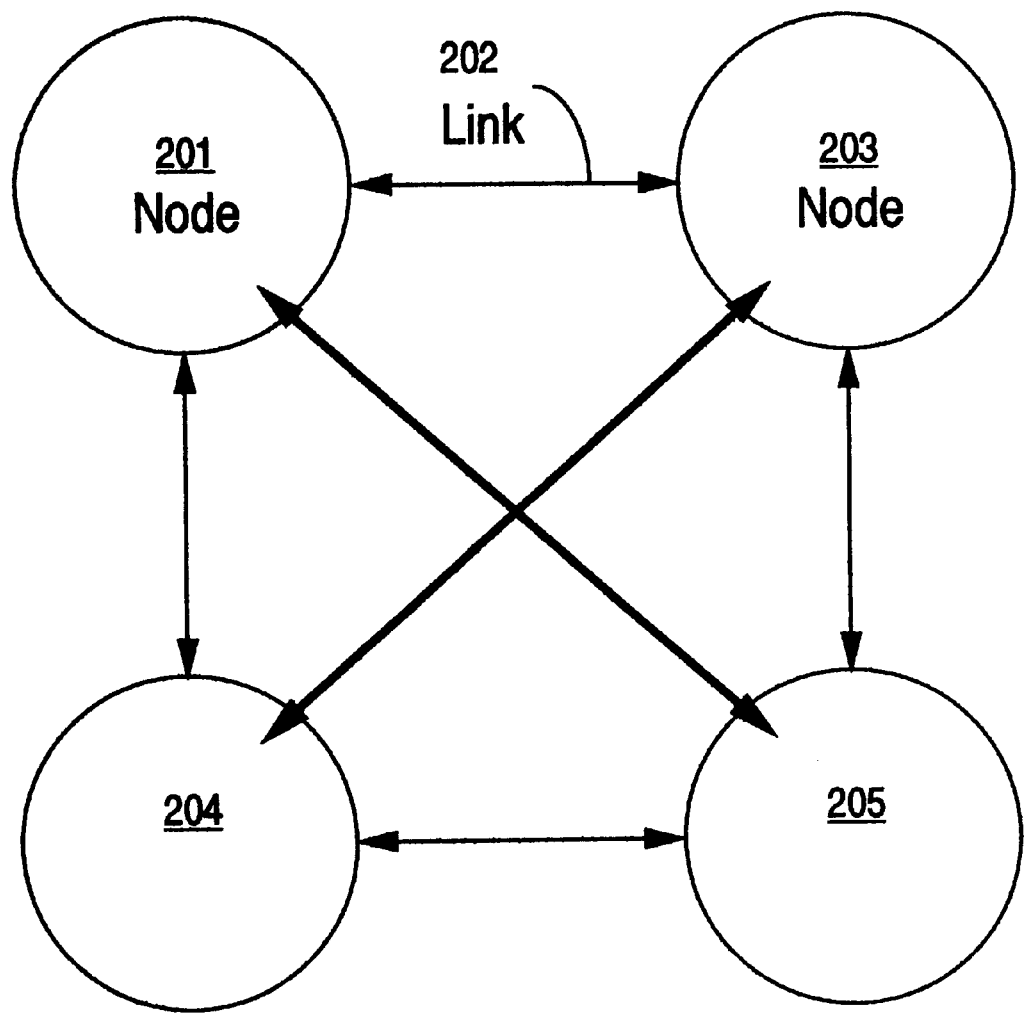
FIG. 2 illustrates a computer network consisting of several computers that are connected by a communication network.

FIG. 2 illustrates a computer network consisting of several computers 201, 203, 204, and 205 connected by a communication network. Each computer in a network will be referred to as a node. For example, element 201 represents a node. A connection for communication between machines shall be referred to as a link. For example, reference numeral 202 represents a link between nodes 201 and 203. In FIG. 2, the underlying communication network is shown to have a bi-directional link for each distinct pair of nodes. However, it shall be understood that this is not a requirement of the current invention.

Figure 3:
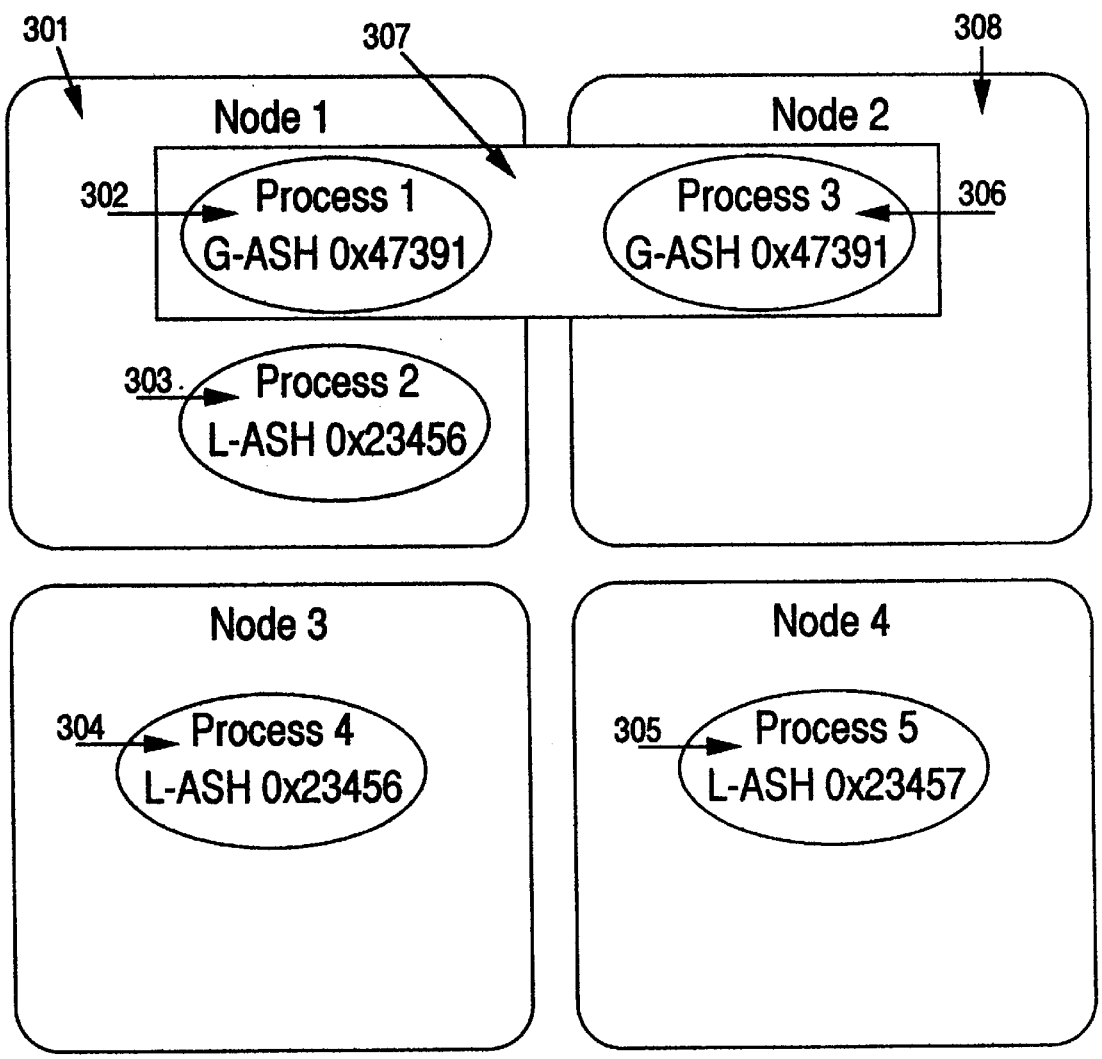
FIG. 3 shows an array session that is being run on several nodes of a computer network.

A process is defined as a computation task that is to be run on a node. The node on which a process runs is said to be the local node of the process. In FIG. 3, node 301 is the local node for process 1. Process 1 is labeled with a reference numeral 302. A process may spawn other processes on the same or different nodes. The currently preferred embodiment of present invention provides a means for managing multiple disjoint sets of related processes across multiple nodes in a computer network. Such a system is used, for example, to remove a set of related processes from the network or to report resource usage of a set of processes. A set of related processes shall hereafter be referred to as an "array session."

In the present invention, array sessions are distinguished by unique identifiers, which are referred to as the array session "handle" (ASH). There are two classes of array session handles: local array session handles and global array session handles. Local array session handles are guaranteed to be unique on the node on which it was created. In other words, no two array sessions on a single node at the same time may have the same local array session handle. A local array session handle is sufficient for a set of processes that remains solely on a single node during its lifetime.

On the other hand, global array session handles are guaranteed to be unique across the entire network. No two array sessions on the network at the same time may have the same global array session handle. A global array session handle is required for any array session that runs on more than one node during its lifetime. In the currently preferred embodiment, array session handles are 64-bit values. Referring to FIG. 3, processes 2 (303), process 4 (304), and process 5 (305) have local array session handles that are unique on their local nodes. Note that processes 2 (303) and 4 (305) have the same local array session handle (e.g., 0x23456), but they run on different nodes, thus maintaining the requirement that local array session handles are unique on their local nodes. Meanwhile, process 1 (302) and process 3 (306) are part of the same array session 307. Thereby, they have the same global array session handle (e.g., 0x47391), even though they lie on different nodes 301 and 308.

The manner used to distinguish local and global array session handles can be arbitrary. The preferred method is to use a specified prefix or suffix to denote a global array session handle. It may also be possible to arrange it so that local array session handles can serve as global array session handles by enforcing restrictions on the local array handles usable by each node in standard ways. For example, if each machine can only provide array session handles using a specific prefix or suffix, then a local array session handle would be unique across the entire network.

Array sessions can be used to record resource usage or other accounting data in a more concise manner. Resource usage is recorded when an array session terminates (i.e., when the last process in an array session completes). Recall that standard systems record when every process terminates. This recording method reduces the amount of time and space necessary to record resource usage information by reducing the granularity at which things are recorded.

Associated with every array session is a block of data that is referred to as the service provider information. The service provider information may be modified to include whatever information is desired. The standard use of the service provider information is to record data useful for resource accounting, such as the name of the initiator of the job. The service provider information is, by default, reported as part of the array session accounting data.

Array session handles are managed and monitored by a process on each node. This process shall be referred to as the array services "daemon." The array services daemon need not be the same on every node. The minimal functionality of the array services daemon will be specified as described below. It should be noted, however, the functionality of an array services daemon may be extended to provide more services as desired.

Array services daemons are responsible for providing an interface between each local machine and a the network. The minimal functionality of the array services daemon includes the following. The array services daemon maintains information about the configuration of the underlying network. The array services daemon also maintains information regarding array sessions on the local machine and can obtain information regarding all array sessions on the network from the other array services daemons. In particular, the array services daemons collectively maintain information regarding all running processes and their associated array sessions. Array services daemons are also responsible for forwarding commands among nodes in the network. If a user wishes to enact a command on a set of processes in a possibly global array session, the local array services daemon forwards the command to the other relevant nodes associated with that particular session. In addition, array services daemons are responsible for providing global array session handles to the local node upon request.

Figure 4:
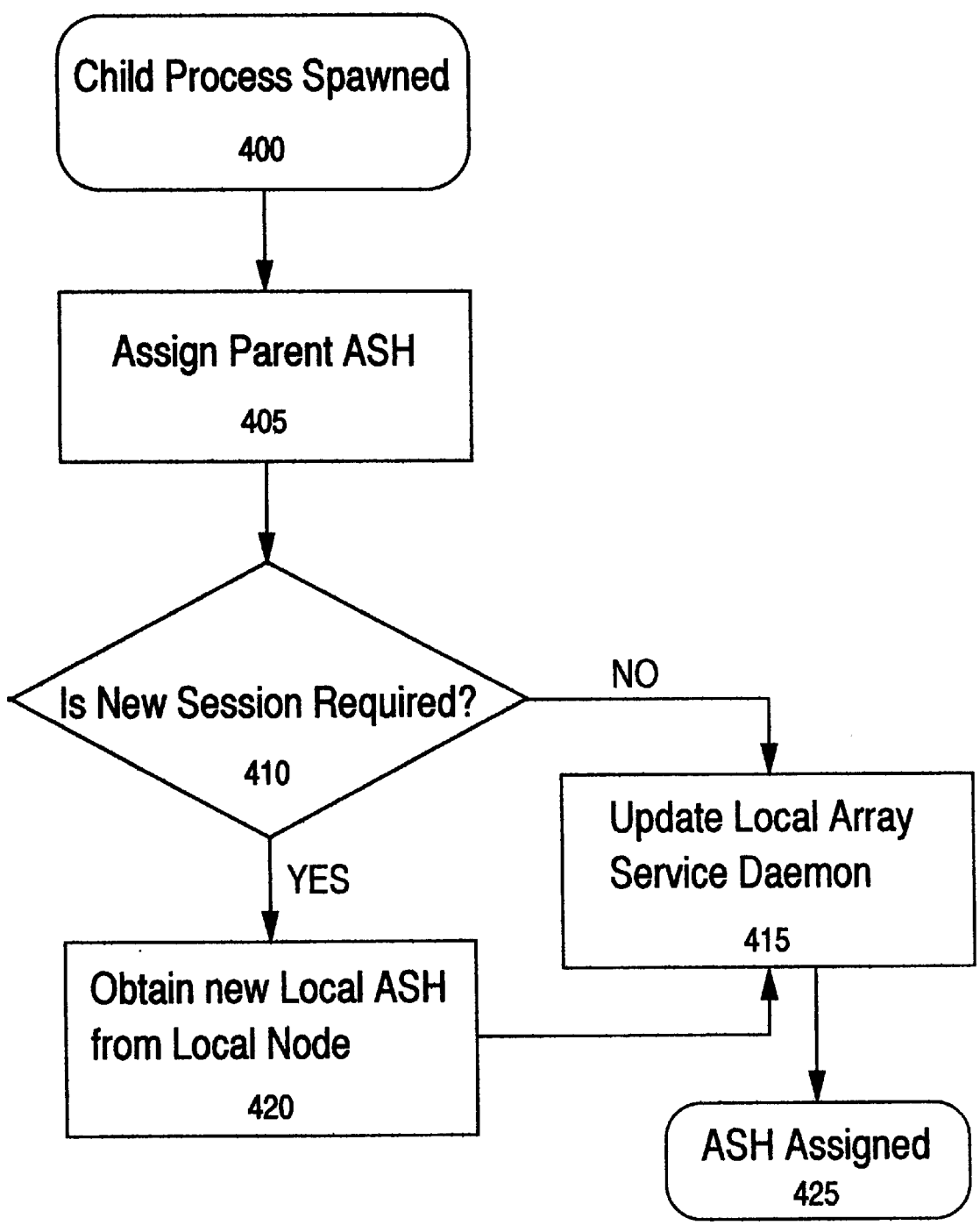
FIG. 4 is a flowchart describing the steps for dividing a large process into several, smaller processes.

FIG. 4 is a flowchart describing the steps for dividing a large process into several, smaller processes. When one process spawns another process, the first process is called the "parent" and the new process is called the "child." Initially, the parent process is divided into two or more child processes, step 400. Every new child process established on a node is initially assigned the array session handle of its parent, step 405. The child process can be assigned a new local array session handle immediately, if so requested, step 410. In one case, a new local array session handle is determined by the kernel of the local node, step 420. The local array services daemon must then update its information to account for the new process, step 415. After this is completed, the assignation process is finished, step 425.

Figure 5:
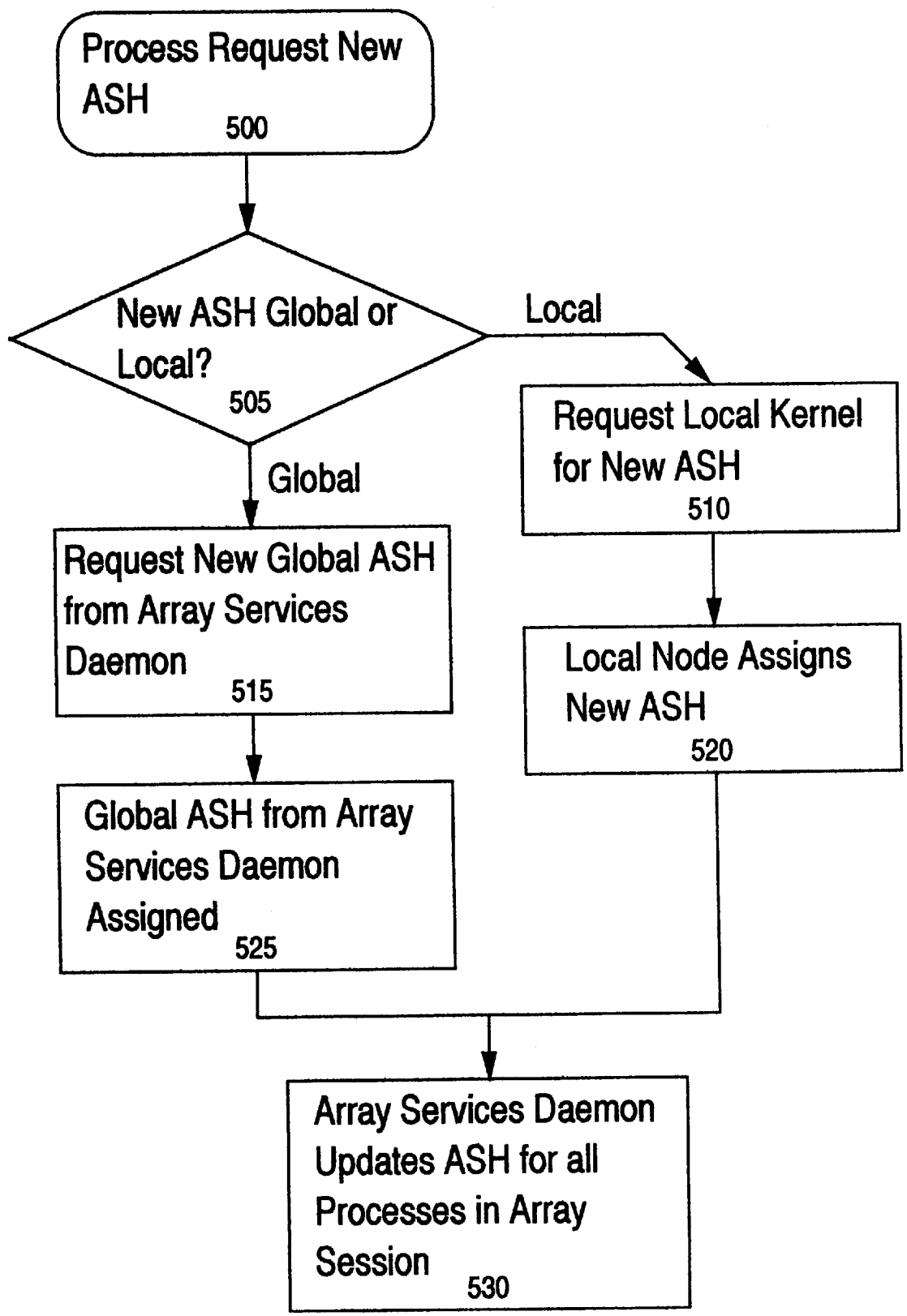
FIG. 5 is a flowchart describing the steps for assigning a new array session handle.

FIG. 5 is a flowchart describing the steps for assigning a new array session handle. A process may need to request a new array session handle, if for example, the process determines that it is required to spawn related processes, across several different nodes instead of a single node. A determination is made as to whether the process requires a new global or a new local array session handle, step 505. If a new local array session handle is required, one is requested from the local kernel, step 510, and the local node assigns the new ASH, step 520. In some cases, a global array session handle is needed to replace a local session handle. If a process requires a new global array session handle, the array services daemon is invoked to determine and assign a new global array session handle, steps 515 and 525. Finally, once the new array session handle its determined, the array service daemon must update all the array session handle of all processes in the same array session, step 530.

Figure 6A:
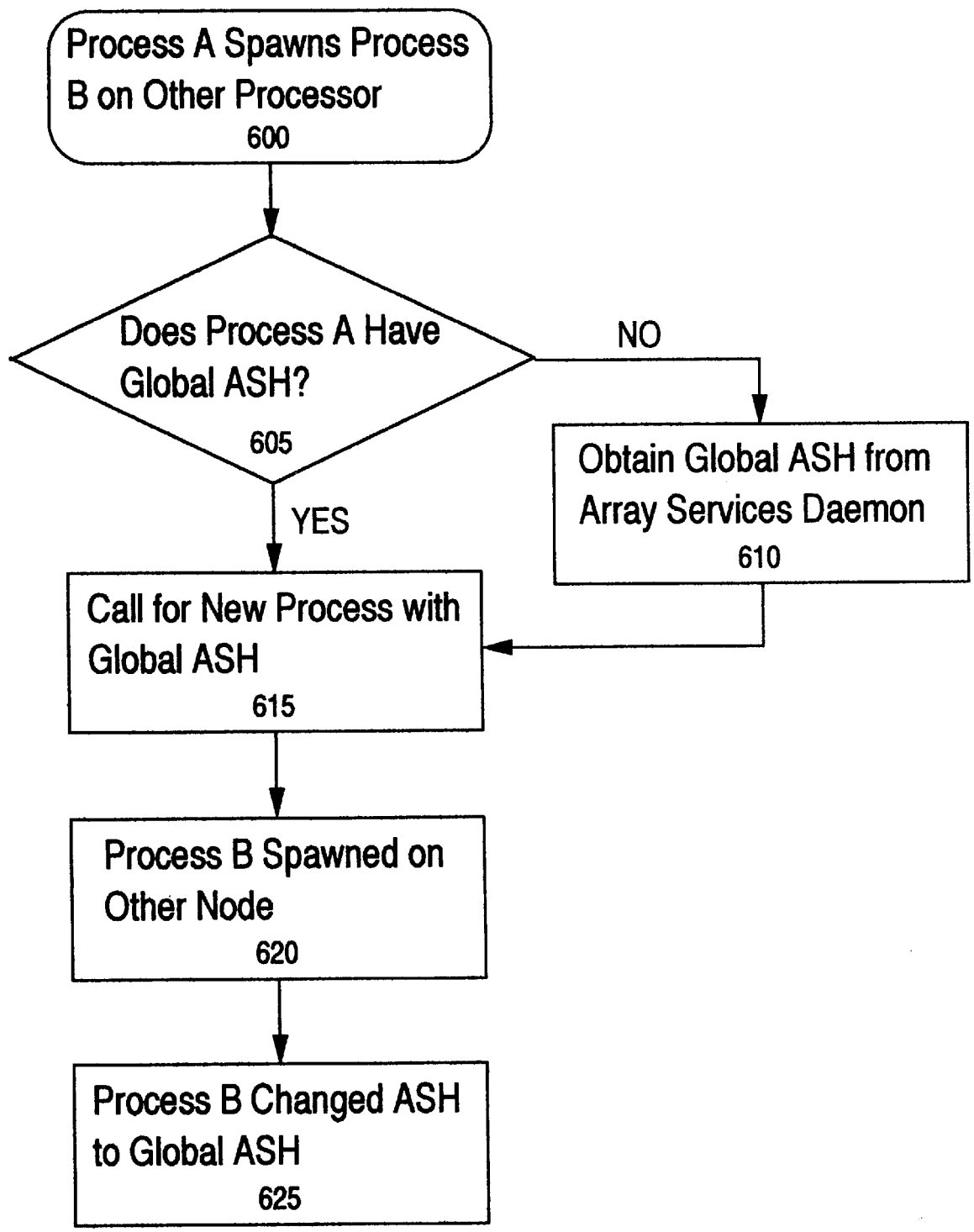
FIG. 6a is a flowchart describing how a single process can spawn a related process over a network to form an array session over several nodes.

FIG. 6a is a flowchart describing how a single process can spawn a related process over a network to form an array session over several nodes. Initially, process A on node 1 wants to spawn a child on node 2, step 600. Process A first ensures that its array session handle is a global array session handle, step 605. If it is not a global ASH, the process calls to the local array services daemon to obtain a global array session handle and changes it in the manner presented in FIG. 5, step 610. Process A then requests to spawn a process, which we shall denote by process B, on node 2, step 615. With the request, process A passes along the global array session handle. When Process B is spawned on node 2, step 620, it initially has the array sessions handle of the parent process on node 2 (see FIG. 4). Process B then requests to change its array session handle to that sent by process A, step 625.

Figure 6B:
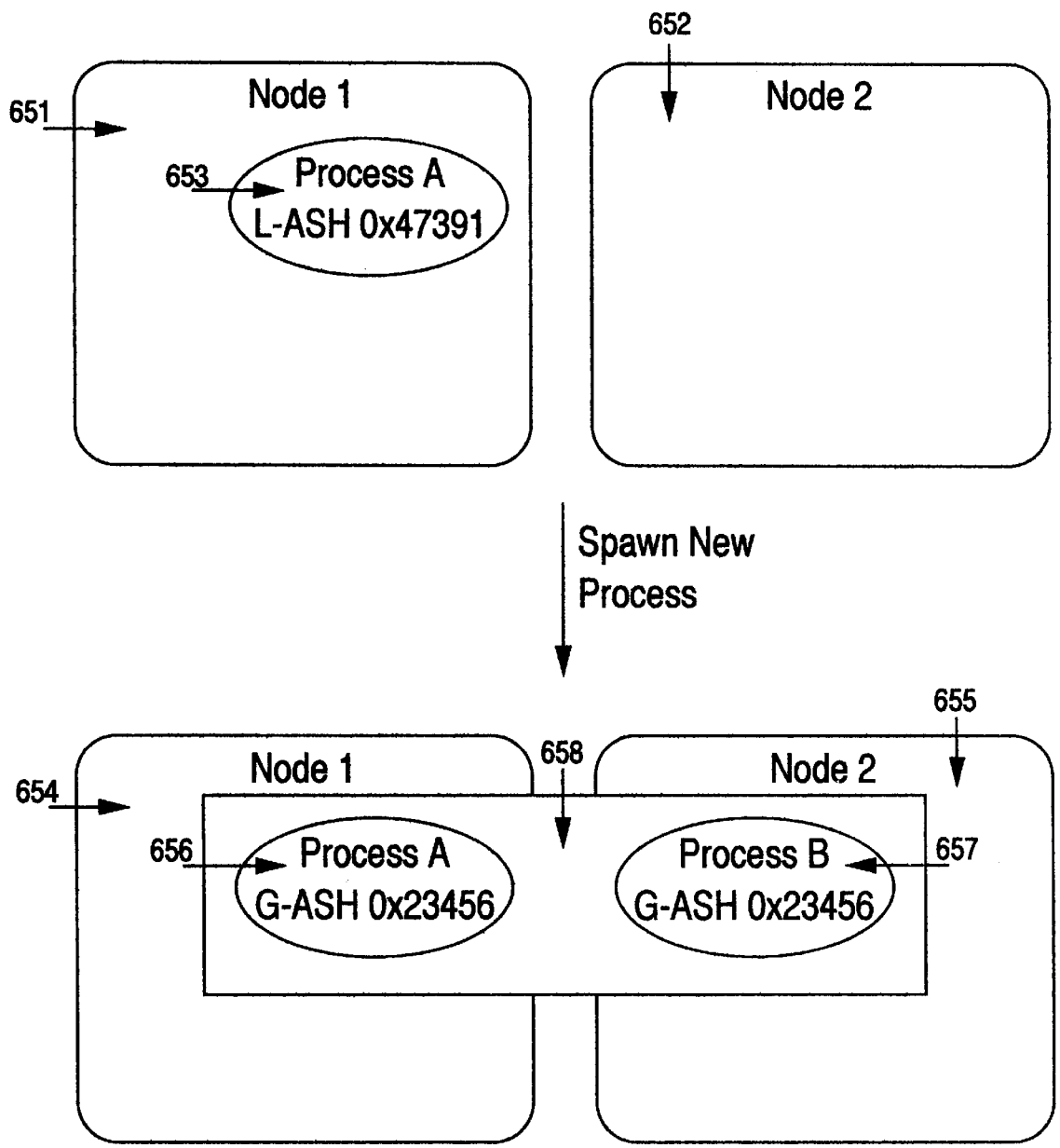
FIG. 6b is a block diagram showing the overall change in the state of the system when a new process is spawned.

FIG. 6b is a block diagram showing the overall change in the state of the system when a new process is spawned. Before a new process is spawned, Process A (653) resides on node 1 (651). Process A has a local array session handle of 0x47391. After the new process is spawned, Process A (656) resides on node 1 (654), and Process B (657) resides on node 2 (655). Both processes share the same global array session handle: 0x23456. As a result, the are part of the same array session 658.

Figure 7:
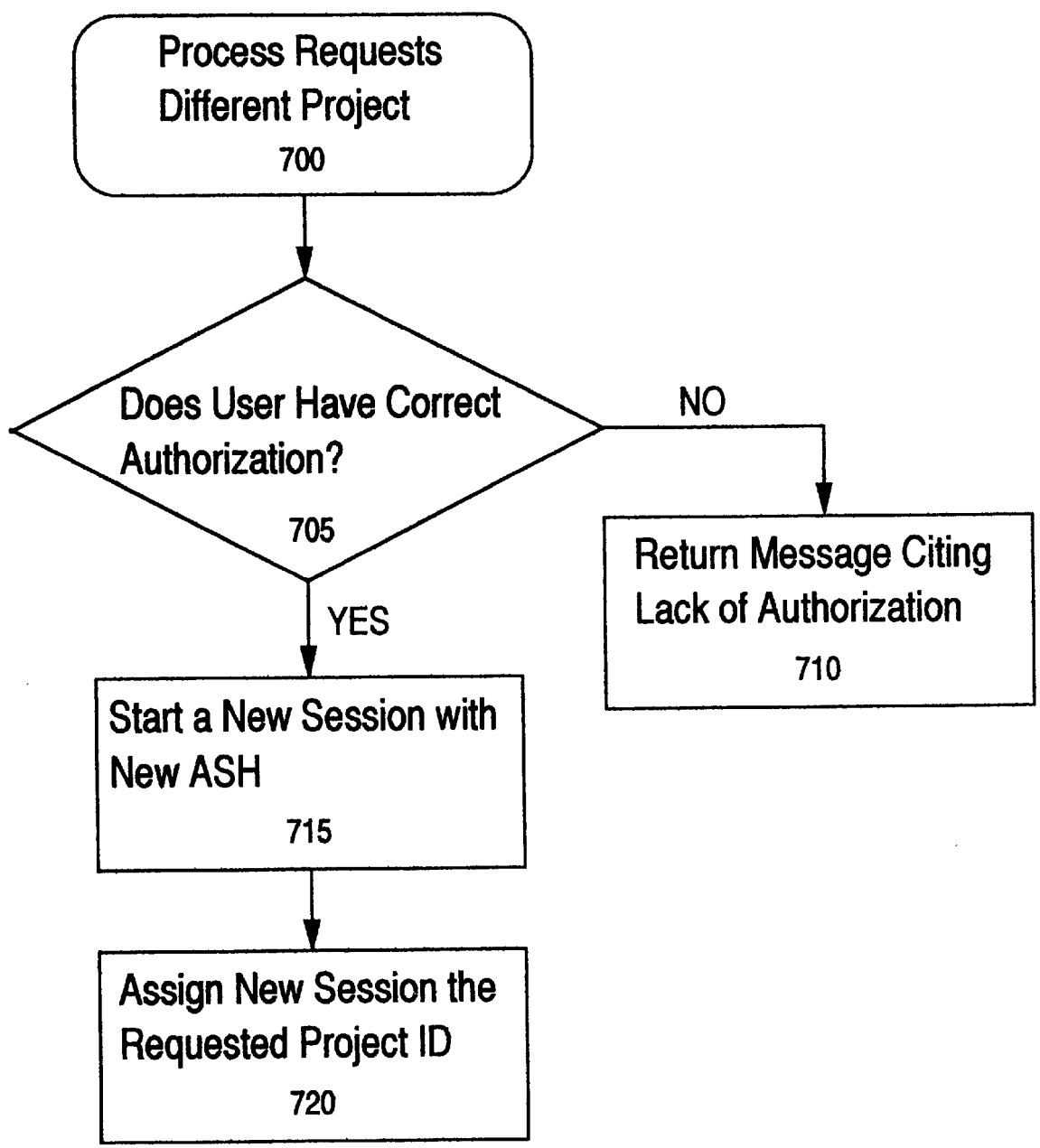
FIG. 7 is a flowchart describing the steps of how a single user can effectively charge their resource usage to different agents or "projects."

FIG. 7 is a flowchart describing the steps of how a single user can effectively charge their resource usage to different agents or "projects." In the currently preferred embodiment, each project has an associated ID number and each user can be identified by a user-name. Each user may possess a default project associated to them through their user-name. If they wish their resource usage to be charged to another project, they issue the appropriate command, step 700. Ensuring that a user is using only appropriate accounts can be accomplished using standard techniques, such as maintaining a file associating user names with valid projects. If the user does not have correct authorization, as determined in step 705, the change of project request is terminated with an appropriate message, step 710. If it is determined in step 705 that the user does have appropriate authorization, a new array session is established, step 715. This is accomplished in the manner as described above with reference to FIG. 4. In step 720, the new project ID is associated with the new array session for recording purposes. The project ID can be stored as part of the service provider information or in another structure associated with the process.

Figure 8:
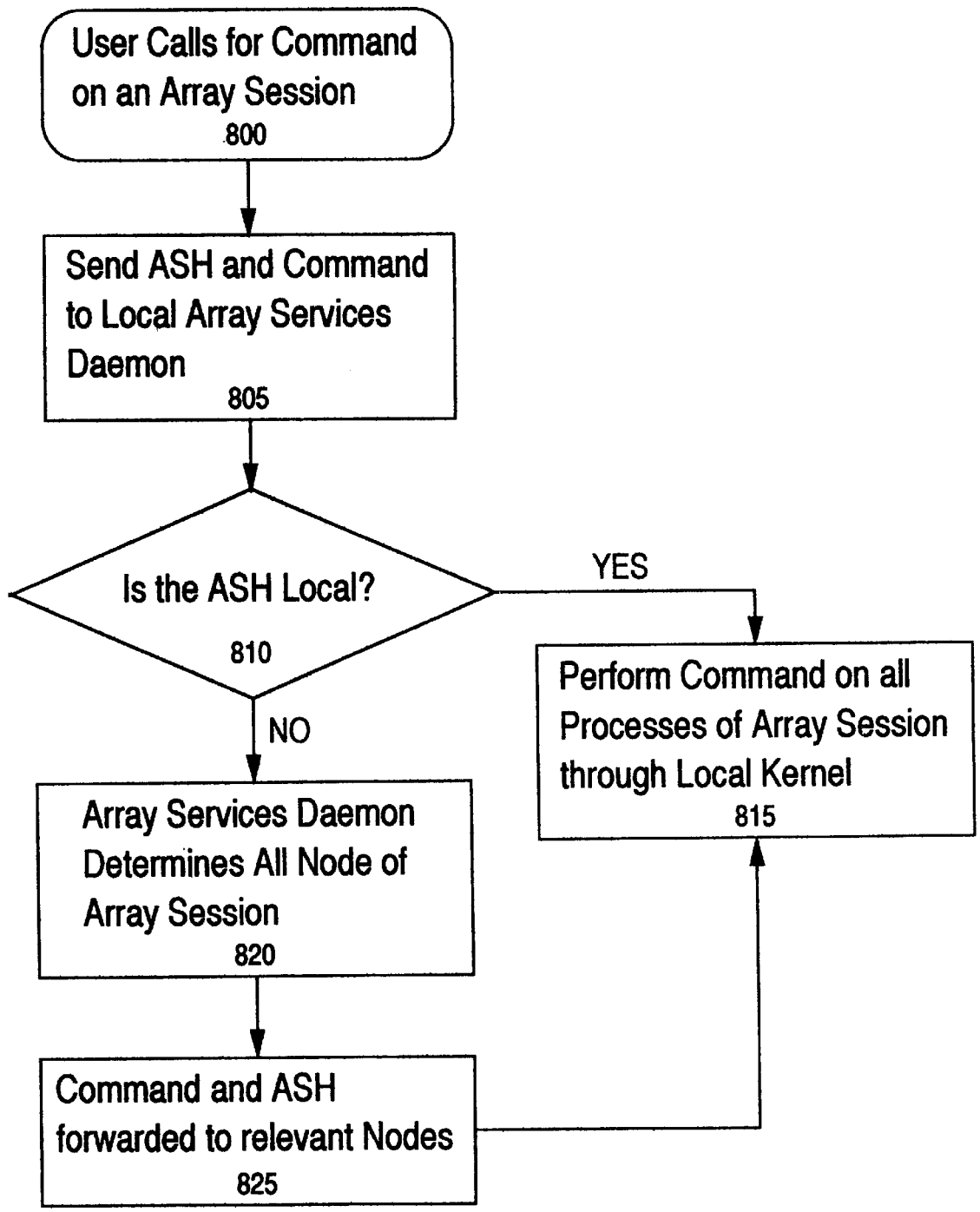
FIG. 8 is a flowchart showing the steps for describing the actions that occur when a user wishes to perform an action (e.g., a deletion) on all the processes of an array session.

FIG. 8 is a flowchart showing the steps for describing the actions that occur when a user wishes to perform an action (e.g., a deletion) on all the processes of an array session. The action is initiated by the user calling for the command on the array session, step 800. In response, the command and array session handle are sent to the array services daemon, step 805. A determination is made as to whether the array session handle is a local array session handle, step 810. If so, then the array services daemon can perform the command through the local kernel, step 815. Otherwise, if the array session handle is a global array session handle, then the array services daemon uses its stored information to determine the other nodes on which the array session is running step 820. The array services daemon communicates the command and array session handle to the other nodes on which the array session is running through the communication layer of the network, step 825. All relevant array services daemons then perform the command on the local processes of the array session, step 815.

An example is now offered to describe how child processes are spawned on remote machines. For array sessions to have any value across multiple machines in an array, it is necessary to ensure that related processes remain in the same array session, even when they are started on a different machine than their parent process. Because the operating systems on separate machines do not coordinate process information with each other, it is necessary for user programs to synchronize their array sessions manually. This procedure can be handled by the library that is spawning the remote child.

Given that process 123 resides on machine A and its program directs it to spawn a child process on machine B, the first step is to ensure that the array session corresponding to process 123 has a global ASH. If there is no corresponding global ASH, then process 123 requests a global ASH from some external agent (e.g., the array services daemon). The agent is responsible for ensuring that the global ASH is unique across the entire array. It changes the ASH of its array session by using a "set ASH" system call. For this example, suppose that the system call results in the global ASH "4444"being assigned to the array session of process 123. Next, process 123 initiates the child process on machine B (e.g., message passing, rsh, etc.). In addition to passing along the name of the program to be invoked, it also passes along its current ASH, 4444. Now, suppose that the resulting process on machine B is 567. At this stage, the child process is unrelated to array session 4444. Hence, process 567 disassociates itself from the array session of this "surrogate parent" by executing the system call to start a new array session. This results in process 567 being in a new array session with an arbitrarily assigned ASH, for example, ASH 8888.

Process 567 effectively joins the array session of its "real" parent (i.e., process 123 on machine A), by invoking the system call to change the ASH of its array session from 8888 to the ASH that was passed along from machine A (i.e., 4444). Now, process 123 on machine A and process 567 both belong to an array session with the global array session handle 4444. Consequently, by definition, they both belong to the same array session. Any children of process 123 on machine A and of process 567 on machine B will also become members of array session 4444 by default. Utility programs, such as the array services daemon, can take advantage of this synchronized ASH to perform operations on the array session as a single entity. Some examples include killing, checkpointing, coordinating accounting, and suspending or resuming the process(es), etc.

The example described above assumes that there is a single process on each machine that is responsible for spawning all of the children for a given array session on that machine. An alternative embodiment is to have children for multiple array sessions on a machine spawned by a single parent. In this case, the first child to be spawned on each machine follows the above description, but subsequent child processes would follow a different scheme, set forth as follows. Process 123 or one of its local children on machine A initiates another child process on machine B and passes the global ASH 4444 along with its program information. Suppose, for this example, that the resulting process on machine B is 890. Again, it belongs to some unrelated array session on machine B. Lastly, process 890 disassociates itself from its original array session and, in the same step, joins existing array session 4444 by executing a "join array session" system call.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer network, a method of associating a plurality of related processes residing on separate computers of the computer network so that the related processes can be handled as a single array session, wherein the method is comprised of the steps of:

initiating a first process running on a first computer of the computer network;

generating a first identifier corresponding to a first array session;

assigning the first identifier to the first process running on the first computer of the computer network which uniquely identifies the first process as belonging to the first array session and the first process having only one unique identifier that is used to identify one specific array session;

spawning a plurality of processes from the first process to help the first process, wherein the plurality of processes run on separate computers of the computer network;

assigning the first identifier to each of the plurality of spawned processes to indicate that each of the plurality of processes belong to a first array session, wherein each of the plurality of spawned processes only have one identifier which is used to uniquely identify one specific array session;

issuing a command by an operating system, wherein the command includes the first unique identifier;

executing the command by all of the plurality of processes running on the separate computers which belong to the first array session and all processes not having the first identifier ignoring the command;

creating a second process from the first process;

assigning a second identifier to the second process, the second identifier uniquely corresponding to a second array session;

spawning a plurality of processes from the second process to help the second process, wherein the plurality of processes spawned by the second process belong to the second array session and are each assigned the second identifier, each of the plurality of processes spawned by the second process having only the second identifier which is used to uniquely identify the second array session;

issuing tasks to either the first array session or the second array session depending on the identifier specified in the task, wherein different tasks can be issued to different array sessions.

2. The method of claim 1 further comprising the step of accounting for resource usage of a task examining processing performed by all processes having the first unique identifier.

3. The method of claim 1, wherein the command corresponds to job control.

4. The method of claim 1, wherein the command corresponds to checkpointing.

5. In a computer network having a plurality of computers coupled together, a method of correlating a plurality of processes running on a plurality of the computers so that the processes are treated as one single array session for purposes of executing one or more commands, the method comprising the steps of:

executing the processes on separate computers of the computer network;

assigning an identifier to each of the plurality of processes, wherein the processes are correlated according to their respective identifier and each process only has a single identifier which is used to uniquely identify one particular array session to which that particular process belongs;

grouping all processes having a first identifier into a first array session and all processes having a second identifier into a second array session;

issuing a command having a specific identifier which identifies one of the array sessions;

examining each of the processes running on the computers of the computer network to determine all processes belonging to that particular array session;

executing the command for only those processes belonging to that particular array session and executing a different command to a different array session.

6. The method of claim 5 further comprising the steps of:

allocating a plurality of identifiers so that each group of related processes running on the computer network has an associated identifier that is unique;

storing information pertaining to a configuration of the plurality of processes;

forwarding commands to only those processes having the same identifier.

7. The method of claim 5 further comprising the step of accounting for resource usage according to the processes that have the unique identifier.

8. A method of handling processes running on different computers of a computer network so that the processes are treated as a single array session when performing a same task, wherein the method is comprised of the steps of:

creating a group of related processes belonging to a first array session, wherein each of the related processes of the group has only one identifier which uniquely points to the first array session and each of the related processes has no other identifier pointing to a different array session;

changing the identifier for one of the related processes of the first array session to a new identifier, which creates a second array session;

obtaining information pertaining to the related processes based on the identifier;

performing the same task for each process belonging to the first array session according to the information that was obtained;

changing the identifier of one process to assign that process to a different array session;

issuing a command, wherein the command contains a command identifier;

examining each of the processes running on the computers to determine which of the processes contain the command identifier;

selectively executing the command for only those processes of the array session having the command identifier and selectively executing a different command for a different array session.

9. The method of claim 8, further comprising the steps of:

generating identifiers that are unique within a local computer;

generating identifiers that are unique through all of the computers of the computer network.

10. The method of claim 8, wherein the obtaining step obtains a list of processes that have the same identifier.

11. The method of claim 8, wherein the obtaining step obtains the identifier corresponding to a particular process.

12. The method of claim 8 further comprising the steps of:

creating a second process on a second computer from a first process on a first computer;

determining whether the identifier associated with the first process is unique across all of the computers of the computer network;

changing the identifier of the first process if it is not unique;

changing the identifier associated with the second process to the identifier associated with the first process.

13. The method of claim 8, wherein the task is job control.

14. The method of claim 8, wherein the task is checkpointing.

15. The method of claim 8, wherein the task is accounting.

* * * * *